(12) United States Patent
Mori et al.

US011621417B2

(10) Patent No.: US 11,621,417 B2
(45) Date of Patent: Apr. 4, 2023

(54) LITHIUM ION SECONDARY BATTERY

(71) Applicant: GS Yuasa International Ltd., Kyoto (JP)

(72) Inventors: Sumio Mori, Kyoto (JP); Tomonori Kako, Kyoto (JP); Akihiko Miyazaki, Kyoto (JP); Masashi Takano, Kyoto (JP); Ukyo Harinaga, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 317 days.

(21) Appl. No.: 16/765,203

(22) PCT Filed: Nov. 21, 2018

(86) PCT No.: PCT/JP2018/042965
§ 371 (c)(1),
(2) Date: May 19, 2020

(87) PCT Pub. No.: WO2019/103031
PCT Pub. Date: May 31, 2019

(65) Prior Publication Data
US 2020/0295364 A1 Sep. 17, 2020

(30) Foreign Application Priority Data
Nov. 22, 2017 (JP) .............................. JP2017-224745

(51) Int. Cl.
*H01M 4/505* (2010.01)
*H01M 4/525* (2010.01)
*H01M 4/587* (2010.01)
*H01M 10/0525* (2010.01)

(52) U.S. Cl.
CPC .......... *H01M 4/505* (2013.01); *H01M 4/525* (2013.01); *H01M 4/587* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2005/0130040 A1 | 6/2005 | Yang et al. | |
| 2005/0238958 A1 | 10/2005 | Kim | |
| 2007/0111106 A1* | 5/2007 | Kim ...................... | H01M 4/525 429/324 |
| 2009/0027831 A1 | 1/2009 | Tasaki et al. | |
| 2009/0214951 A1 | 8/2009 | Yoshikawa et al. | |
| 2009/0253025 A1 | 10/2009 | Jay | |
| 2009/0301866 A1 | 12/2009 | Karim et al. | |
| 2010/0159334 A1* | 6/2010 | Kashima ........... | H01M 10/0569 429/231.95 |
| 2012/0021273 A1 | 1/2012 | Ohmori et al. | |
| 2013/0212879 A1 | 8/2013 | Ogino | |
| 2014/0065491 A1 | 3/2014 | Yokouchi et al. | |
| 2014/0184159 A1* | 7/2014 | Kachi ...................... | B60L 7/12 320/109 |
| 2014/0255796 A1* | 9/2014 | Matsuoka ............. | H01M 4/139 429/188 |
| 2014/0322576 A1 | 10/2014 | Okumura et al. | |
| 2015/0115896 A1* | 4/2015 | Shimomura ...... | H01M 10/0525 429/231.1 |
| 2015/0249272 A1 | 9/2015 | Sakai et al. | |
| 2016/0156069 A1 | 6/2016 | Sakai et al. | |
| 2017/0179537 A1 | 6/2017 | Sakai et al. | |

FOREIGN PATENT DOCUMENTS

| | | |
|---|---|---|
| CN | 101621214 A * | 1/2010 |
| EP | 2720302 A2 | 4/2014 |
| JP | 9-283117 A | 10/1997 |
| JP | 10-241670 A | 9/1998 |
| JP | 2002-42889 A | 2/2002 |
| JP | 2004-288405 A | 10/2004 |
| JP | 2005-150117 A | 6/2005 |
| JP | 2005-158754 A | 6/2005 |
| JP | 2007-42525 A | 2/2007 |
| JP | 2007-134218 A | 5/2007 |
| JP | 2009-26542 A | 2/2009 |
| JP | 2009-525568 A | 7/2009 |
| JP | 2009-199929 A | 9/2009 |
| JP | 2010-95390 A | 4/2010 |
| JP | 2010-225525 A | 10/2010 |
| JP | 2010-282836 A | 12/2010 |
| JP | 2011-519122 A | 6/2011 |
| JP | 2012-164571 A | 8/2012 |
| JP | 2012-174577 A | 9/2012 |
| JP | 2012-238418 A | 12/2012 |
| JP | 2013-191552 A | 9/2013 |
| JP | 2014-103087 A | 6/2014 |
| JP | 2015-26541 A | 2/2015 |
| JP | 2015-153584 A | 8/2015 |
| JP | 2016-91927 A | 5/2016 |

(Continued)

OTHER PUBLICATIONS www.espacenet.com machine translation of the detailed description of JP 09-283117. (Year: 1997).*
www.espacenet.com machine translation of the detailed description of JP 2007-134218A. (Year: 2007).*
Abstract of CN 101621214A (Year: 2010).*
Extended European Search Report (EESR) dated Jul. 5, 2021 in the corresponding European Patent Application No. 188812168.
International Search Report (ISR) dated Feb. 26, 2019 filed in PCT/JP2018/042965.

*Primary Examiner* — Gregg Cantelmo
(74) *Attorney, Agent, or Firm* — Rankin, Hill & Clark LLP

(57) ABSTRACT

The present embodiment provides a lithium ion secondary battery including a positive electrode containing $Li_aNi_xCo_yM_zO_2$ ($0.9 \leq a \leq 1.2$, $0.3 \leq x \leq 0.8$, $0.2 \leq y+z \leq 0.7$, where M is a metal element other than Li, Ni, and Co) as a positive active material, and a negative electrode containing non-graphitic carbon as a negative active material. In this lithium ion secondary battery, at a portion where the positive electrode and the negative electrode face each other, a basis weight (P) of the positive active material and a basis weight (N) of the negative active material satisfy a relational expression of $0.65 \leq P/N \leq 1.05$.

8 Claims, 2 Drawing Sheets

(56) References Cited

FOREIGN PATENT DOCUMENTS

| WO | 2006/112067 A1 | 10/2006 |
| WO | 2012/147761 A1 | 11/2012 |
| WO | 2013/128676 A1 | 9/2013 |
| WO | 2014/038711 A1 | 3/2014 |

* cited by examiner

LITHIUM ION SECONDARY BATTERY

TECHNICAL FIELD

The present invention relates to a lithium ion secondary battery.

BACKGROUND ART

Conventionally, there has been known a lithium secondary battery including an internal electrode assembly in which a positive electrode plate in which a positive active material containing a lithium transition metal composite oxide is disposed in a predetermined region on a surface of a positive electrode metal foil body, and a negative electrode plate in which a negative active material containing a carbonaceous material is disposed in a predetermined region on a surface of a negative electrode metal foil body are wound or stacked with a separator interposed between the electrode plates (for example, Patent Document 1).

In the lithium secondary battery described in Patent Document 1, a ratio value (C/A) of a mass per unit arrangement area (C (g/cm$^2$)) of the surface of the negative electrode metal foil body of the negative active material to a mass per unit arrangement area (A (g/cm$^2$)) of the surface of the positive electrode metal foil body of the positive active material satisfies a relationship of 0.9≤(C/A)≤2.5, and the output is 200 W or more.

PRIOR ART DOCUMENT

Patent Document

Patent Document 1: JP-A-2004-288405

SUMMARY OF THE INVENTION

Problems to be Solved by the Invention

Lithium secondary batteries have a problem that due to overcharge, their performance is significantly reduced or they become unusable, and therefore, abuse has been conventionally prevented by using a protection circuit against overcharge. However, if the protection circuit does not operate sufficiently for some reason, abuse may occur. On the other hand, in the case of changing a positive electrode material of the lithium secondary battery to a material having high thermal stability such as lithium manganate or lithium iron phosphate, predetermined durability against overcharge can be obtained. However, with this, leaving durability is lowered, so that it is difficult to achieve both relatively high overcharge resistance and relatively high leaving durability.

An object of the present embodiment is to provide a lithium ion secondary battery having resistance to overcharge and relatively high leaving durability.

Means for Solving the Problems

A lithium ion secondary battery of the present embodiment includes a positive electrode containing Li$_a$Ni$_x$Co$_y$M$_z$O$_2$ (0.9≤a≤1.2, 0.3≤x≤0.8, 0.2≤y+z≤0.7, where M is a metal element other than Li, Ni, and Co) as a positive active material, and a negative electrode containing non-graphitic carbon as a negative active material. In this lithium ion secondary battery, at a portion where the positive electrode and the negative electrode face each other, a basis weight (P) of the positive active material and a basis weight (N) of the negative active material satisfy a relational expression of 0.65≤P/N≤1.05.

Advantages of the Invention

According to the present embodiment, it is possible to provide a lithium ion secondary battery having resistance to overcharge and relatively high leaving durability.

MODE FOR CARRYING OUT THE INVENTION

Hereinafter, an embodiment of a lithium ion secondary battery according to the present invention will be described with reference to FIGS. 1 and 2. Names of constituent members (constituent elements) according to the present embodiment are effective in the present embodiment, and can be different from names of constituent members (constituent elements) according to the background art.

A lithium ion secondary battery 1 of the present embodiment is a battery utilizing electron transfer occurring with the movement of lithium ions. The lithium ion secondary battery 1 supplies electric energy. The lithium ion secondary battery 1 is used alone or in combination. Specifically, when the required output and the required voltage are small, the lithium ion secondary battery 1 is used alone. On the other hand, when at least one of the required output and the required voltage is large, the lithium ion secondary battery 1 is used for an energy storage apparatus (battery module) in combination with another lithium ion secondary battery 1. In the energy storage apparatus, the lithium ion secondary battery 1 used for the energy storage apparatus supplies electric energy.

Figure 1:
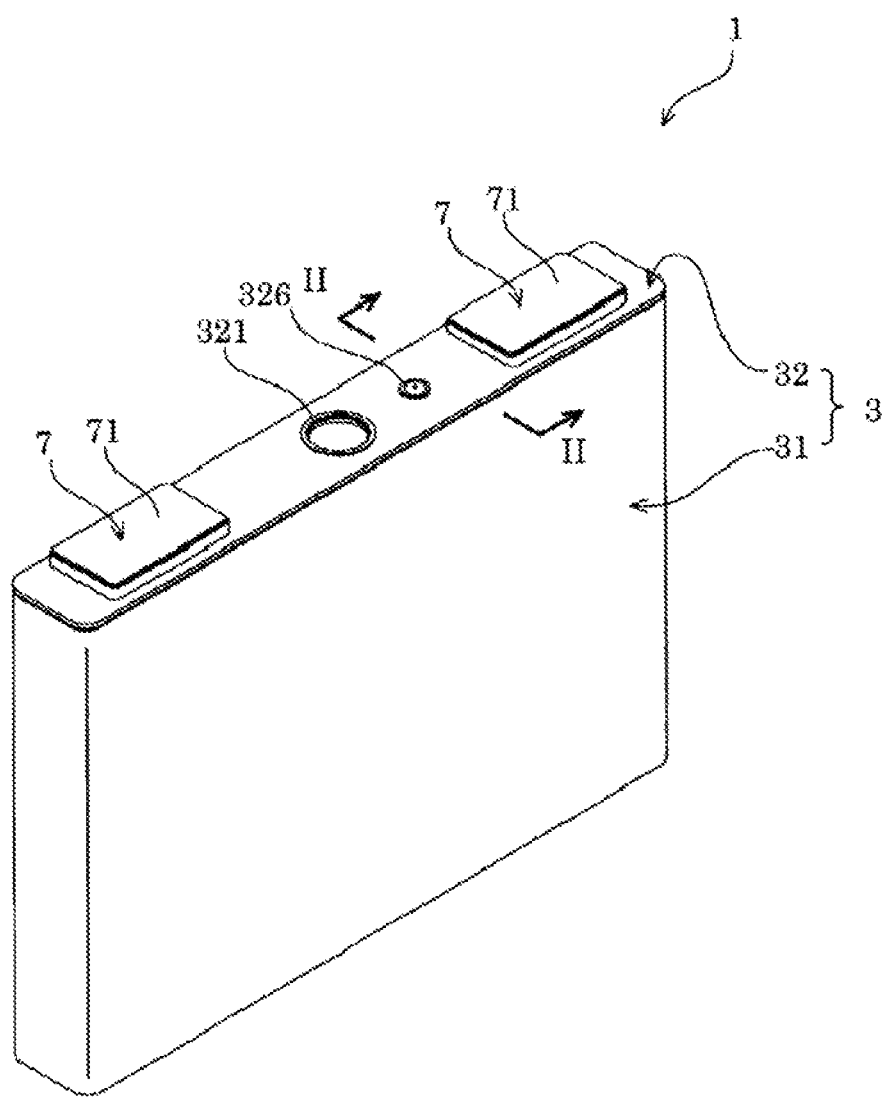
FIG. 1 is a perspective view of a lithium ion secondary battery according to the present embodiment.
Figure 2:
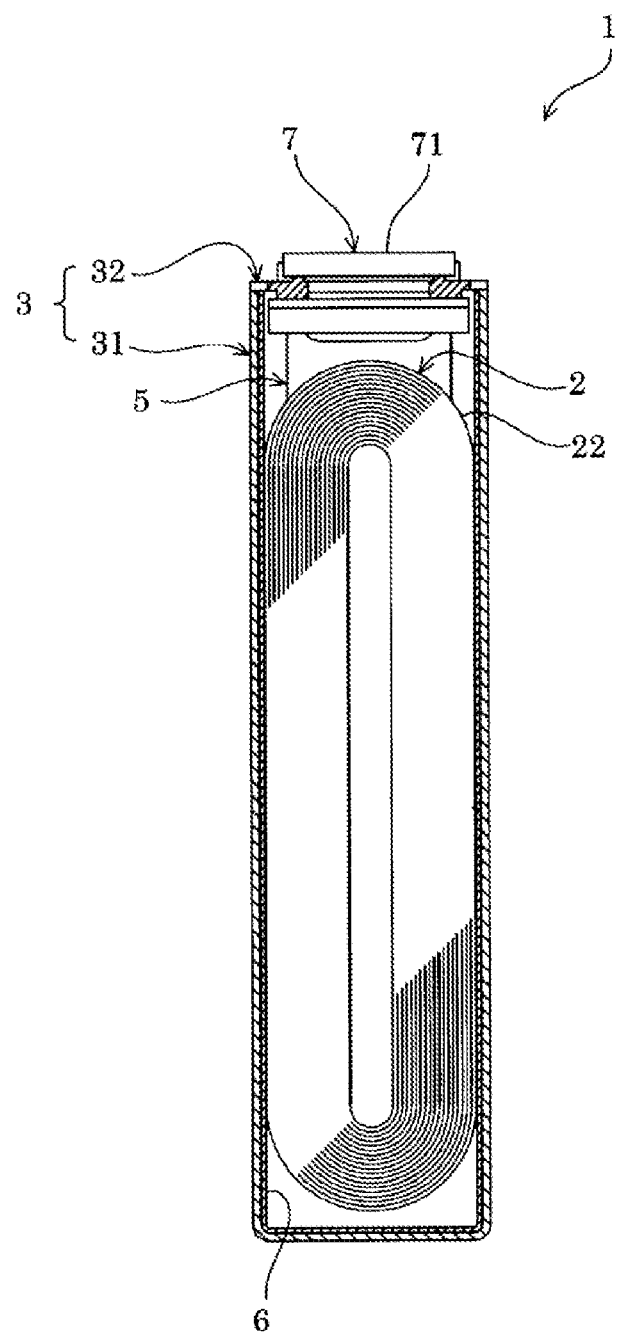
FIG. 2 is a sectional view taken along the line II-II in FIG. 1.

As shown in FIGS. 1 and 2, the lithium ion secondary battery 1 includes an electrode assembly 2 including a positive electrode and a negative electrode, a case 3 for housing the electrode assembly 2, and an external terminal 7 disposed outside the case 3 and conductively connected to the electrode assembly 2. The lithium ion secondary battery 1 includes a current collecting member 5, conductively connecting the electrode assembly 2 and the external terminal 7, and the like in addition to the electrode assembly 2, the case 3, and the external terminal 7.

The electrode assembly 2 is formed by winding a layered product 22 in which the positive electrode and the negative electrode are stacked while being insulated from each other by a separator.

The positive electrode has a metal foil (current collector) and a positive active material layer overlaid on a surface of the metal foil and containing active material particles. In the present embodiment, the positive active material layers are respectively overlapped on both surfaces of the metal foil. The positive electrode may have a thickness of 40 μm or more and 150 μm or less.

The metal foil is band-shaped. The metal foil of the positive electrode of the present embodiment is, for example, an aluminum foil. The positive electrode has an uncovered portion (section where the positive active material layer is not formed) of the positive active material layer at one edge portion in a width direction which is a transverse direction of the band shape.

The positive active material layer includes a particulate active material (active material particles), a particulate conductive auxiliary, and a binder. The positive active material layer may include the active material in an amount of 80% by mass or more and 98% by mass or less. A thickness of the positive active material layer (one layer) may be 12 μm or more and 70 μm or less. A basis weight of the positive active material layer (one layer) may be 4 mg/cm$^2$ or more and 17 mg/cm$^2$ or less. A density of the positive active material layer may be 1.5 g/cm$^3$ or more and 3.0 g/cm$^3$ or less. The basis weight and the density correspond to one layer disposed to cover one surface of the metal foil.

The basis weight of the positive active material layer can be calculated by the following method. When the density of a manufactured and used battery is measured, the battery is discharged to 2.0 V at 3 A current (current equivalent to 1 C if a rated capacity of the battery can be grasped), and then held at 2.0 V for 5 hours. After the holding, the battery is rest for 5 hours, and an electrode assembly is taken out of a case inside a glove box in a dry room or an argon atmosphere. The positive electrode taken out of the electrode assembly is washed three times or more with dimethyl carbonate (DMC) having a purity of 99.9% or more and a water content of 20 ppm or less. Thereafter, the DMC is removed by vacuum drying. Then, a test piece having a size of a set area S (cm$^2$), for example, 4 cm$^2$ (2 cm×2 cm) is cut out, and a mass W1 (mg) is measured. The active material layer and the metal foil are separated by immersion in pure water or the like. After the separation, a mass W2 (mg) of the metal foil is measured. The basis weight of the active material layer is calculated by (W1−W2)/S.

The active material of the positive electrode is a compound capable of inserting and extracting lithium ions. The active material of the positive electrode contains at least a lithium transition metal oxide of $Li_aNi_xCo_yM_zO_2$ (0.9≤a≤1.2, 0.3≤x≤0.8, 0.2≤y+z≤0.7, where M is a metal element other than Li, Ni, and Co). M in the above composition formula may include at least one metal element selected from the group consisting of Mn, Al, Mg, Zr, W, Ti, and B.

In the present embodiment, when a potential of the positive electrode is 4.25 V in terms of lithium potential, a charge capacity (charge current per a unit area of the electrode: 0.5 mA/cm$^2$) is preferably 110 mAh/g or more and 230 mAh/g or less. The charge capacity is more preferably 150 mAh/g or more and 200 mAh/g or less, and still more preferably 160 mAh/g or more and 180 mAh/g or less.

When the active material of the positive electrode is a lithium transition metal oxide having the above composition, and when the charge capacity is within the above numerical range, in relation to a charge-discharge capacity of a carbon material (hardly graphitizable carbon) used for the negative electrode, it is possible to achieve both resistance to overcharge and relatively high leaving durability.

In the present embodiment, the active material of the positive electrode may be a lithium transition metal composite oxide represented by the chemical composition of $Li_aNi_xCo_yMn_zO_2$ (provided that 0.9≤a≤1.2, x+y+z=1, 0.3≤x≤0.8, 0.2≤y≤0.7, and 0.2≤z≤0.7). The values may be within ranges: x≤0.55, y≤0.34, and 0.25≤z≤0.34).

The lithium transition metal composite oxide represented by the chemical composition of $Li_aNi_xCo_yMn_zO_2$ as described above is, for example, $LiNi_{1/3}Co_{1/3}Mn_{1/3}O_2$ or $LiNi_{0.55}Co_{0.20}Mn_{0.25}O_2$.

An average particle size (D50) of the active material particles of the positive electrode may be 2.0 μm or more and 20 μm or less.

The binder used for the positive active material layer is, for example, polyvinylidene fluoride (PVdF), a copolymer of ethylene and vinyl alcohol, polymethyl methacrylate, polyethylene oxide, polypropylene oxide, polyvinyl alcohol, polyacrylic acid, polymethacrylic acid, styrene butadiene rubber (SBR), carboxymethyl cellulose salt (CMC), or the like. The binder of the present embodiment is polyvinylidene fluoride.

The conductive auxiliary of the positive active material layer is a carbonaceous material. The carbonaceous material is, for example, Ketjen Black (registered trademark), acetylene black, graphite, or the like. The positive active material layer of the present embodiment has acetylene black as a conductive auxiliary. The positive active material layer may contain 1% by mass or more and 15% by mass or less of the conductive auxiliary.

The negative electrode has a metal foil (current collector) and a negative active material layer formed on the metal foil. In the present embodiment, the negative active material layers are respectively overlapped on both surfaces of the metal foil. The negative electrode may have a thickness of 40 μm or more and 150 μm or less. The metal foil is band-shaped. The negative electrode has an uncovered portion (section where the negative active material layer is not formed) of the negative active material layer at one edge portion in a width direction which is a transverse direction of the band shape.

The negative electrode has a metal foil (current collector) and a negative active material layer formed on the metal foil. In the present embodiment, the negative active material layers are respectively overlapped on both surfaces of the metal foil. The metal foil is band-shaped. A material of the metal foil is preferably aluminum or an aluminum alloy. In the present embodiment, the metal foil is an aluminum foil or an aluminum alloy foil, and preferably an aluminum foil. The aluminum alloy is an alloy containing 90% by mass or more of aluminum. A conductive layer may be formed on a surface of the metal foil containing aluminum. It is considered that when the metal foil contains aluminum, dissolution of the metal foil is suppressed and resistance to overdischarge is exerted even when an energy storage device is in an overdischarged state. The negative electrode has an uncovered portion (section where the negative active material layer is not formed) of the negative active material layer at one edge portion in a width direction which is a transverse direction of the band shape. The negative electrode may have a thickness of 40 μm or more and 150 μm or less.

The negative active material layer includes at least a particulate active material (active material particles) and may include a binder. The negative active material layer is disposed so as to face the positive electrode with the separator interposed therebetween. The width of the negative active material layer is larger than the width of the positive active material layer.

The negative active material layer may include the active material in an amount of 80% by mass or more and 98% by mass or less. A thickness of the negative active material layer (one layer) may be 10 μm or more and 100 μm or less. A basis weight of the negative active material layer (one layer) may be 2 mg/cm$^2$ or more and 10 mg/cm$^2$ or less. The basis weight of the negative active material layer is measured by the same method as described above. A density of the negative active material layer (one layer) may be 0.5 g/cm$^3$ or more and 6.0 g/cm$^3$ or less.

The active material of the negative electrode can contribute to electrode reactions such as a charge reaction and a discharge reaction in the negative electrode. The active material of the negative electrode of the present embodiment is non-graphitic carbon. More specifically, the active material of the negative electrode is hardly graphitizable carbon.

The non-graphitic carbon in the present specification is one in which, in a discharge state, an average plane spacing $d_{002}$ of the (002) plane determined by a wide-angle X-ray diffraction method using CuKα radiation as a source is 0.340 nm or more and 0.390 nm or less. In addition, the hardly graphitizable carbon is one in which the average plane spacing $d_{002}$ is 0.360 nm or more and 0.390 nm or less.

The binder (organic binder) that can be included in the negative active material layer is the same as the binder used for the positive active material layer. As the binder, for example, styrene butadiene rubber (SBR), carboxymethyl cellulose salt (CMC), or the like is used.

The negative active material layer may further include a conductive auxiliary such as Ketjen Black (registered trademark) or acetylene black.

In the present embodiment, a ratio (P/N) of the basis weight (P) of the positive active material to the basis weight (N) of the negative active material is 0.65 or more and 1.05 or less. The basis weight (P) of the positive active material can be calculated by multiplying the basis weight of the positive active material layer described above by a mass ratio of the positive active material in the positive active material layer. Similarly, the basis weight of the negative active material can be calculated by multiplying the basis weight of the negative active material layer by a mass ratio of the negative active material in the negative active material layer. When the above ratio (P/N) is 0.65 or more, the potential of the positive electrode is relatively low, and durability is exhibited. When the ratio is 1.05 or less, the charge depth of the negative electrode is relatively shallow, and the resistance to overcharge is exhibited. Therefore, the lithium ion secondary battery 1 can have resistance to overcharge and relatively high leaving durability. In addition, as described above, when the lithium transition metal oxide of $Li_aNi_xCo_yM_zO_2$ ($0.9 \leq a \leq 1.2$, $0.3 \leq x \leq 0.8$, $0.2 \leq y+z \leq 0.7$, where M is a metal element other than Li, Ni, and Co) is used as the active material of the positive electrode, although the leaving durability at high temperatures may not be maintained, the leaving durability at high temperatures is exhibited when the above ratio (P/N) is 0.65 or more.

On the other hand, if the above ratio (P/N) is less than 0.65, the durability may be insufficient, and if the ratio exceeds 1.05, acceptability of Li ions is reduced in the negative electrode, or thermal stability of the negative electrode is reduced, so that the resistance to overcharge may be insufficient.

When the charge voltage of the lithium ion secondary battery of the present embodiment is 3.6 V, the potential of the negative electrode may be 300 mV or more and 500 mV or less in terms of lithium potential. When the above potential is 300 mV or more, the battery can have higher resistance to overcharge. When the above potential is 500 mV or less, the battery can have higher leaving durability. The potential of the negative electrode may be 350 mV or more. The potential of the negative electrode can be adjusted by changing the basis weight of the positive active material and the basis weight of the negative active material. Specifically, the potential of the negative electrode can be made more noble by reducing the basis weight of the positive active material with respect to the basis weight of the negative active material.

In the electrode assembly 2 of the present embodiment, the positive electrode and the negative electrode configured as described above are wound while being insulated by the separator. That is, in the electrode assembly 2 of the present embodiment, the layered product 22 of the positive electrode, the negative electrode, and the separator is wound. The separator is a member having an insulating property. The separator is disposed between the positive electrode and the negative electrode. Thereby, in the electrode assembly 2 (specifically, the layered product 22), the positive electrode and the negative electrode are insulated from each other. The separator holds an electrolyte solution in the case 3. Thus, during charge and discharge of the lithium ion secondary battery 1, lithium ions move between the positive electrode and the negative electrode alternately stacked with the separator interposed between the electrodes.

The separator has a band shape. The separator has a porous separator substrate. The separator is disposed between the positive electrode and the negative electrode to prevent a short circuit between the positive electrode and the negative electrode. The separator of the present embodiment has only a separator substrate.

The separator substrate is porous. The separator substrate is, for example, a woven fabric, a nonwoven fabric, or a porous membrane. Examples of the material of the separator substrate include a polymer compound, glass, and ceramic. Examples of the polymer compound include at least one selected from the group consisting of polyesters such as polyacrylonitrile (PAN), polyamide (PA), and polyethylene terephthalate (PET), polyolefins (PO) such as polypropylene (PP) and polyethylene (PE), and cellulose.

The width of the separator (the dimension in the transverse direction of the band shape) is slightly larger than the width of the negative active material layer. The separator is disposed between the positive electrode and the negative electrode, which are stacked and staggered in the width direction in such a manner that the positive active material layer and the negative active material layer overlap each other.

The electrolyte solution is a nonaqueous electrolyte solution. The electrolyte solution is obtained by dissolving an electrolyte salt in an organic solvent. Examples of organic solvents include cyclic carbonates, such as propylene carbonate and ethylene carbonate, and linear carbonates, such as dimethyl carbonate, diethyl carbonate, and ethyl methyl carbonate. The electrolyte salt is $LiClO_4$, $LiBF_4$, $LiPF_6$ or the like. The electrolyte solution of the present embodiment is obtained by dissolving 0.5 mol/L or more and 1.5 mol/L or less of $LiPF_6$ in a mixed solvent of propylene carbonate, dimethyl carbonate, and ethyl methyl carbonate mixed in a predetermined ratio.

The case 3 includes a case body 31 having an opening, and a lid plate 32 blocking (closing) the opening of the case body 31. The case 3 accommodates, in the internal space, the electrode assembly 2, the current collecting member 5, and the like, as well as the electrolyte solution. The case 3 is formed of a metal having resistance to the electrolyte solution.

The case 3 is formed by joining an opening peripheral edge of the case body 31 and a peripheral edge of the rectangular lid plate 32 overlapped each other. The case 3 has an internal space defined by the case body 31 and the lid plate 32. In the present embodiment, the opening peripheral edge of the case body 31 and the peripheral edge of the lid plate 32 are joined by welding.

The lid plate 32 has a gas release valve 321 that can discharge gas in the case 3 to the outside. The gas release valve 321 discharges the gas from the inside of the case 3 to the outside when an internal pressure of the case 3 rises to a predetermined pressure. The gas release valve 321 is provided at a central portion of the lid plate 32.

The case 3 is provided with an electrolyte solution filling hole for injecting the electrolyte solution. The electrolyte solution filling hole allows the inside of the case 3 to communicate with the outside. The electrolyte solution filling hole is provided in the lid plate 32. The electrolyte solution filling hole is sealed (closed) by an electrolyte solution filling plug 326. The electrolyte solution filling plug 326 is fixed to the case 3 (the lid plate 32 in the example of the present embodiment) by welding.

The external terminal 7 is a portion electrically connected to the external terminal 7 of another lithium ion secondary battery 1, an external device, or the like. The external terminal 7 is formed of a conductive member. The external terminal 7 has a surface 71 to which a bus bar or the like can be welded. The surface 71 is a plane.

The current collecting member 5 is disposed in the case 3 and is directly or indirectly connected to the electrode assembly 2 so as to be able to be connected conductively. The current collecting member 5 of the present embodiment is formed of a conductive member. The current collecting member 5 is disposed along an inner surface of the case 3. The current collecting member 5 is conductively connected to the positive electrode and the negative electrode of the lithium ion secondary battery 1.

In the lithium ion secondary battery 1 of the present embodiment, the electrode assembly 2 in the state of being housed in a bag-shaped insulating cover 6 that insulates the electrode assembly 2 and the case 3 (specifically, the electrode assembly 2 and the current collecting member 5) is housed in the case 3.

Next, a method for manufacturing the lithium ion secondary battery 1 of the above embodiment will be described.

For example, in the method for manufacturing the lithium ion secondary battery 1, first, a composition containing an active material is applied to a metal foil, an active material layer is formed, and a positive electrode and a negative electrode are fabricated. A commercially available separator is prepared, or a separator is manufactured. Next, the electrode assembly 2 is formed by overlapping the positive electrode, the separator, and the negative electrode. In addition, the lithium ion secondary battery 1 is assembled by putting the electrode assembly 2 in the case 3 and placing the electrolyte solution in the case 3.

In the fabrication of the positive electrode, for example, a positive active material layer is formed by applying a composition containing active material particles, a binder, a conductive auxiliary, and a solvent to both surfaces of the metal foil. As an application method for forming the positive active material layer, a general method is employed. The basis weight of the positive active material layer can be adjusted by changing the amount of application. The applied positive active material layer is roll-pressed at a predetermined pressure. The thickness and density of the positive active material layer can be adjusted by adjusting the pressing pressure. The negative electrode can be similarly fabricated.

In the formation of the electrode assembly 2, the electrode assembly 2 is formed by winding the layered product 22 having a separator interposed between the positive electrode and the negative electrode. Specifically, the positive electrode, the separator, and the negative electrode are stacked in such a manner that the positive active material layer and the negative active material layer face each other with the separator interposed between the layers, thereby forming the layered product 22. The electrode assembly 2 is formed by winding the layered product 22.

In the assembly of the lithium ion secondary battery 1, the electrode assembly 2 is placed in the case body 31 of the case 3, the opening of the case body 31 is sealed with the lid plate 32, and an electrolyte solution is injected into the case 3. When sealing the opening of the case body 31 with the lid plate 32, the electrode assembly 2 is placed in the interior of the case body 31, and, in the state where the positive electrode is conductively connected to one external terminal 7, and the negative electrode is conductively connected to the other external terminal 7, the opening of the case body 31 is sealed with the lid plate 32. When the electrolyte solution is injected into the case 3, the electrolyte solution is injected into the case 3 from an injection hole of the lid plate 32 of the case 3.

The lithium ion secondary battery according to the present invention is not limited to the above-mentioned embodiment, but can of course be subjected to various changes and modifications within the scope not departing from the gist of the present invention. For example, a configuration according to an embodiment can additionally be provided with a configuration according to another embodiment, or a configuration according to an embodiment can partially be replaced with a configuration according to another embodiment. Furthermore, a configuration according to an embodiment can be removed partially.

In the above embodiment, the positive electrode in which the active material layer containing the active material is in direct contact with the metal foil has been described in detail. However, in the present invention, the positive electrode may have a conductive layer containing a binder and a conductive auxiliary and disposed between the active material layer and the metal foil.

In the above embodiment, electrodes configured such that an active material layer is disposed on each side of the metal foil of each electrode have been described. However, in the lithium ion secondary battery of the present invention, it is also possible that the positive electrode or the negative electrode has the active material layer only on one side of the metal foil.

In the above embodiment, the lithium ion secondary battery 1 including the electrode assembly 2 obtained by winding the layered product 22 has been described in detail. However, the lithium ion secondary battery of the present invention may include a layered product 22 that is not wound. Specifically, the lithium ion secondary battery may include an electrode assembly formed of a positive electrode, a separator, a negative electrode, and a separator each formed in a rectangular shape and stacked in this order a plurality of times. The shape and size (capacity) of the lithium ion secondary battery 1 are arbitrary.

When an energy storage apparatus in which an upper limit of an ordinary voltage to be used of the lithium ion secondary battery 1 is designed to be 3.6 V, a plurality of such lithium ion secondary batteries 1 are connected in series, and preferably, four lithium ion secondary batteries are connected in series is designed, in the energy storage apparatus, voltage compatibility with a vehicle power supply including a conventional lead-acid battery is caused, and therefore, the energy storage apparatus can be used as a substitute for a lead-acid battery. In the case of using such an energy storage apparatus as a substitute for a lead-acid battery, deep discharge that cannot be achieved by the lead-acid battery can be performed, and in addition, weight reduction can be achieved.

EXAMPLE

A lithium ion secondary battery was manufactured as described below.

Test Example 1

(1) Preparation of Positive Electrode

N-methyl-2-pyrrolidone (NMP) as a solvent, a conduction auxiliary (acetylene black), a binder (PVdF), and particles of an active material ($LiNi_{1/3}Co_{1/3}Mn_{1/3}O_2$) having a median diameter of 4.0 μm were mixed and kneaded to prepare a composition for a positive electrode. The amounts of the conductive auxiliary, the binder, and the active material incorporated were 4.5% by mass, 2.5% by mass, and 93% by mass, respectively. The prepared composition for a positive electrode was applied to both surfaces of an aluminum foil (12 μm in thickness) such that the basis weight of the positive active material layer after drying was 5.3 mg/cm$^2$ (the basis weight (P) of the positive active material in this case was 4.93 mg/cm$^2$). After drying by heating, roll pressing was performed. Then, vacuum drying was performed to remove moisture and the like. The thickness of the active material layer (one layer) after pressing was 19 μm. The density of the active material layer was 2.8 g/cm$^3$.

(2) Preparation of Negative Electrode

As the active material, particulate non-graphitic carbon (hardly graphitizable carbon) having a median diameter of 4 μm was used. PVdF was used as a binder. Water as a solvent, the binder, and the active material were mixed and kneaded to prepare a composition for a negative electrode. The binder was incorporated to be 4% by mass, and the active material was incorporated to be 96% by mass. The prepared composition for a negative electrode was applied to both surfaces of an aluminum foil (12 μm in thickness) such that the basis weight of the negative active material layer after drying was 5.64 mg/cm$^2$ (the basis weight (N) of the negative active material in this case was 5.42 mg/cm$^2$). After drying by heating, roll pressing was performed. Then, vacuum drying was performed to remove moisture and the like. The thickness of the active material layer (one layer) after pressing was 86 μm. The density of the active material layer was 1.1 g/cm$^3$.

The basis weight of the negative active material layer was set so that the potential of the negative electrode was 400 mV in terms of lithium potential when an upper-limit charge voltage of the battery was 3.6 V.

(3) Separator (Separator Substrate)

As a separator substrate, a microporous membrane made of polyethylene having a thickness of 22 μm was used. The resistance to air permeability of the microporous membrane made of polyethylene was 100 sec/100 cc.

(4) Preparation of Electrolyte Solution

As an electrolyte solution, one prepared by the following method was used. As a nonaqueous solvent, a solvent obtained by mixing one part by volume of each of propylene carbonate, dimethyl carbonate, and ethyl methyl carbonate was used. $LiPF_6$ was dissolved in this nonaqueous solvent to a salt concentration of 1 mol/L, thereby preparing an electrolyte solution.

(5) Disposition of Electrode Assembly in Case

Using the above positive electrode, the above negative electrode, the above electrolyte solution, a separator, and a case, a battery was assembled by an ordinary method.

First, a sheet-shaped product formed of a layered product of the positive electrode, the negative electrode, and the separator therebetween was wound. Next, an electrode assembly formed by winding was disposed in a case body of a prismatic container can made of aluminum serving as a case. Subsequently, the positive electrode and the negative electrode were electrically connected to two external terminals, respectively. Further, a lid plate was attached to the case body. The above electrolyte solution was injected into the case from an electrolyte solution filling port formed in the lid plate of the case. Finally, the electrolyte solution filling port of the case was sealed, thereby hermetically closing the case.

With regard to the ratio of the basis weight of the positive active material and the negative active material, the ratio (P/N) of the basis weight (P) of the positive active material to the basis weight (N) of the negative active material was 0.91.

Test Examples 2 to 7

A lithium ion secondary battery was manufactured in the same manner as in Example 1, except that without changing the basis weight of each of the positive active material layer and the positive active material, the basis weight of the negative active material layer was changed in a range of 3.11 to 10.07 mg/cm$^2$ so that the P/N ratio shown in Table 1 was obtained.

Test Example 8

A lithium ion secondary battery was manufactured in the same manner as in Example 1, except that the active material of the positive electrode was changed to an active material with a chemical composition of $LiNi_{0.55}Co_{0.20}Mn_{0.25}O_2$, the basis weight of the negative active material layer was changed to 6.34 mg/cm$^2$, and the basis weight of the positive active material layer was changed to 5.30 mg/cm$^2$.

Test Examples 9 and 10

A lithium ion secondary battery was manufactured in the same manner as in Example 1, except that the active material of the positive electrode was changed to an active material with a chemical composition shown in Table 1, the basis weight of the negative active material layer was changed in a range of 1.50 to 2.31 mg/cm$^2$, and the basis weight of the positive active material layer was changed to 5.30 mg/cm$^2$.

TABLE 1

| | Positive active material | Upper limit voltage (V) | P/N | Negative electrode potential (mV) | 60 A/20 V overcharge (highest temperature/° C.) | Capacity retention ratio after leaving and endurance (%) |
|---|---|---|---|---|---|---|
| Test Example 1 | $LiNi_{0.33}Co_{0.33}Mn_{0.33}O_2$ | 3.6 | 0.91 | 400 | 106 | 73 |
| Test Example 2 | $LiNi_{0.33}Co_{0.33}Mn_{0.33}O_2$ | 3.6 | 0.68 | 500 | 103 | 70 |
| Test Example 3 | $LiNi_{0.33}Co_{0.33}Mn_{0.33}O_2$ | 3.6 | 0.78 | 450 | 105 | 71 |

TABLE 1-continued

|  | Positive active material | Upper limit voltage (V) | P/N | Negative electrode potential (mV) | 60 A/20 V overcharge (highest temperature/° C.) | Capacity retention ratio after leaving and endurance (%) |
|---|---|---|---|---|---|---|
| Test Example 4 | $LiNi_{0.33}Co_{0.33}Mn_{0.33}O_2$ | 3.6 | 1.05 | 350 | 106 | 75 |
| Test Example 5 | $LiNi_{0.33}Co_{0.33}Mn_{0.33}O_2$ | 3.6 | 1.29 | 300 | 250< | 72 |
| Test Example 6 | $LiNi_{0.33}Co_{0.33}Mn_{0.33}O_2$ | 3.6 | 1.65 | 250 | 250< | 70 |
| Test Example 7 | $LiNi_{0.33}Co_{0.33}Mn_{0.33}O_2$ | 3.6 | 0.51 | 600 | 99 | 55 |
| Test Example 8 | $LiNi_{0.55}Co_{0.20}Mn_{0.25}O_2$ | 3.6 | 0.81 | 400 | 106 | 73 |
| Test Example 9 | $LiMn_2O_4$ | 3.6 | 3.43 | 400 | 100 | 49 |
| Test Example 10 | $LiFePO_4$ | 3.6 | 2.22 | 25 | 102 | 48 |

<Evaluation of Resistance to Overcharge>

Each battery was charged up to 3.6 V at 25° C. at a constant current of 3 A and further subjected to low-voltage charge at that voltage for a total of 3 hours. Thereafter, an overcharge test was performed at 25° C. at a constant current of 60 A and a final voltage of 20 V. In such a test, the highest temperature was measured.

<Evaluation of (High Temperature) Leaving Durability>

After each battery was discharged at a constant current of 3 A and a final voltage of 2.4 V, the battery was charged up to 3.6 V at a constant current of 3 A and further charged at a constant voltage of 3.6 V for a total of 3 hours. Thereafter, the battery was discharged at a constant current of 3 A and a final voltage of 2.4 V to measure an initial discharge capacity. Thereafter, each battery was charged up to 3.6 V at 25° C. at a constant current of 3 A and further subjected to low-voltage charge at that voltage for a total of 3 hours. The battery was stored in a thermostat at 65° C. for 30 days (one month). After the battery was maintained at 25° C. for 4 hours, a discharge capacity was measured by the same method as that described above. The battery was left for a total of 90 days, and a discharge capacity retention ratio after 90 days was calculated.

As can be understood from Table 1, the lithium ion secondary battery having the above P/N ratio of 0.65 or more and 1.05 or less had resistance to overcharge and relatively high leaving durability. On the other hand, the lithium ion secondary battery having the P/N ratio of less than 0.65 or more than 1.05 did not have resistance to overcharge or did not have sufficient leaving durability.

It is considered that if the P/N ratio is less than 0.65, the durability is lowered due to a relatively noble potential of the positive electrode and the like. On the other hand, it is considered that if the P/N ratio exceeds 1.05, polarization occurs at the negative electrode during charging, so that Li electrodeposition is likely to occur, and the resistance to overcharge is reduced. It is considered that since the negative active material is hardly graphitizable carbon, the potential of the negative electrode is relatively noble and thermal stability in overcharge is secured.

DESCRIPTION OF REFERENCE SIGNS

1: Lithium ion secondary battery (nonaqueous electrolyte secondary battery)
2: Electrode assembly
3: Case
31: Case body
32: Lid plate
5: Current collecting member
6: Insulating cover
7: External terminal
71: Surface

The invention claimed is:

1. A lithium ion secondary battery comprising:
   a positive electrode containing $Li_aNi_xCo_yM_zO_2$ ($0.9 \leq a \leq 1.2$, $0.3 \leq x \leq 0.8$, $0.2 \leq y+z \leq 0.7$, $x+y+z=1$, wherein M is a metal element other than Li, Ni, and Co) as a positive active material; and
   a negative electrode containing non-graphitic carbon as a negative active material, the negative electrode having a negative current collector containing aluminum,
   wherein at a portion where the positive electrode and the negative electrode face each other, a basis weight (P) of the positive active material and a basis weight (N) of the negative active material satisfy a relational expression of $0.65 \leq P/N \leq 1.05$.

2. The lithium ion secondary battery according to claim 1, wherein when a charge voltage of the lithium ion secondary battery is 3.6 V, a potential of the negative electrode is 300 mV or more and 500 mV or less in terms of lithium potential.

3. The lithium ion secondary battery according to claim 1, wherein the basis weight (P) of the positive active material and the basis weight (N) of the negative active material satisfy a relational expression of $0.65 \leq P/N \leq 0.78$.

4. The lithium ion secondary battery according to claim 1, further comprising an electrolyte solution containing at least one of a cyclic carbonate and a linear carbonate as a solvent.

5. The lithium ion secondary battery according to claim 1, further comprising a separator substrate disposed between the positive electrode and the negative electrode, the separator substrate being a polyolefin (PO) microporous membrane.

6. The lithium ion secondary battery according to claim 1, when a potential of the positive electrode is 4.25 V in terms of lithium potential, a charge capacity is 150 mAh/g or more and 230 mAh/g or less.

7. The lithium ion secondary battery according to claim 1, wherein an upper limit of a voltage to be used of the lithium ion secondary battery is 3.6 V or less.

8. The lithium ion secondary battery according to claim 1, further comprising a separator disposed between the positive electrode and the negative electrode, wherein the separator contains a porous polymer membrane.

* * * * *